July 10, 1934.  H. L. MAXWELL  1,965,847
WELDING TORCH
Filed April 13, 1931
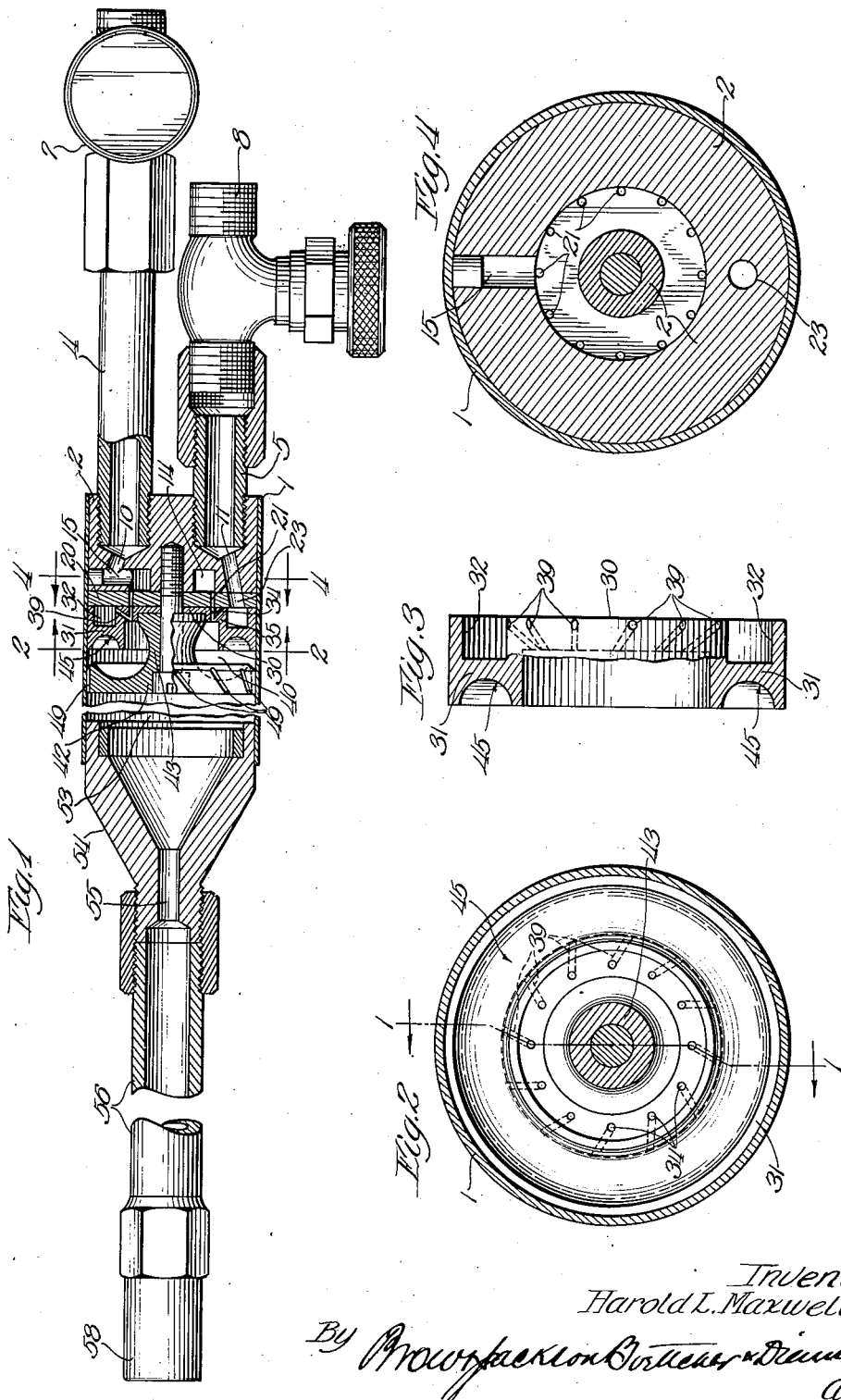
Inventor:
Harold L. Maxwell
By Brown, Jackson, Boettcher & Dienner
Attys.

Patented July 10, 1934

1,965,847

UNITED STATES PATENT OFFICE 1,965,847

WELDING TORCH

Harold L. Maxwell, Wilmington, Del., assignor, by mesne assignments, to Utilities Research Commission, Inc., Chicago, Ill., a corporation of Illinois Application April 13, 1931, Serial No. 529,690

11 Claims. (Cl. 158—27.4)

The present invention relates generally to the art and process of welding, brazing, or fusing and uniting metals by the application of intense heat, which is usually obtained by the combustion of mixture of gases, and has for its principal object the provision of improved means and methods for utilizing a combustible gas or gases of relatively low calorific value, such as, for example, ordinary commercial illuminating gas. These improvements, presently to be described in detail, are principally directed to the feature of securing a perfect and intimate mixture of the gases so that the combustion thereof will proceed at a favorable velocity and be sufficiently efficient that gases of low heat value can be satisfactorily employed in a great number of instances where at the present only the relatively expensive gases of high heat value, such as acetylene, propane, butane, etc., are practically successful. For example, prior to my invention, so far as I am aware there have been no successful fusion welds made by a low calorific gas in wrought iron or steel, such as may be found in structural work and the like, where the material is found in plates from ¼" and upwards in thickness. Wrought iron and structural steel have a relatively high heat conductivity and therefore in order to utilize gases of low heat value to produce a temperature sufficiently high to effect fusion and to take care of the relatively high heat losses by conductivity it is essential to extract as much usable heat as possible from the combustible. According to my present invention this is made possible by virtue of the improved means and method for mixing the combustible and the oxygen. The present invention is, however, ideally adapted for any gas or gases and where high heat value gases, such as acetylene or liquefied hydrocarbon and the like are employed, welding, brazing and cutting operations are greatly facilitated and the gases used with great economy and efficiency.

Briefly, the present invention contemplates the provision of novel means and methods bringing the two gases into contact at a plurality of points and for subjecting the gas streams to various reversals and changes in direction of movement, both in rotational and linear displacement, in connection with imposed velocity changes and aspirating effects, so that by the time the gases reach the place or zone of utilization they are thoroughly and intimately mixed and the flame produced thereby is at a uniformly high temperature and the maximum usable heat is extracted from the gas mixture.

Commercial illuminating gas is almost universally available, is relatively inexpensive, does not require special containers, such as drums, tanks and the like, and is safer to use than other combustibles. Prior to the present invention, however, the use of ordinary illuminating gas has been attended with a number of difficulties, among which may be mentioned the chief difficulty of securing a thoroughly mixed illuminating gas-oxygen mixture, which would produce a flame hot enough to weld such material as wrought iron of commercial thickness, ¼" and above.

The principal object, therefore, of the present invention is the provision of a welding torch capable of welding material such as wrought iron, using a combustible gas of relatively low heat value.

Other objects and advantages of the present invention will be apparent to those skilled in the art after a consideration of the following detailed description of one preferred embodiment, taken in conjunction with the accompanying drawing, illustrating that embodiment, in which:

Figure 1 is a cross-section through a welding torch taken substantially along the line 1—1 of Figure 2 and embodying the principles of the present invention, certain parts being shown in elevation in order to show them more clearly;

Figure 2 is a cross-section taken substantially along the line 2—2 of Figure 1 and looking in the direction of the arrows;

Figure 3 is a view partly in section and partly in elevation showing the ported head which is arranged to give a whirling motion to the entering gases; and Figure 4 is a cross-section taken along the line 4—4 of Figure 1 and looking in the direction of the arrows.

Referring now more particularly to Figure 1, the welding torch of the present invention comprises an exterior casing 1 of substantially cylindrical formation and having at one end a gas receiving head 2 provided with gas connections 4 and 5 including, respectively, valve means 7 and 8. The valve 8 is connected with the source of supply of oxygen and the valve 7 is connected with the supply of city or illuminating gas.

The gas receiving head 2 is provided with a number of ports, one being in communication with the gas connection 4 and the other being in communication with the gas connection 5. The port 10 communicates with the gas connection 4 and the port 11 communicates with the gas connection 5 associated with the supply of oxygen.

The gas receiving head 2 is provided with an annular groove 14 forming in effect an annular gas ring or chamber which is in communication, through port 15, with port 10 and the connection 4 for the supply of combustible gas. As best shown in Figure 1, the port or duct 15 is arranged radially with respect to the gas ring 14, which is concentric with respect to the casing 1, so that the combustible entering through the connection 4 and port 10 does not flow directly into the annular gas ring 14, but flows into the gas ring in a lateral direction which aids in distributing the incoming combustible uniformly throughout the annular gas ring 14.

An orifice plate 20 is mounted in the casing 1 and against the inner end of the gas receiving head 2 and, in effect, completes the gas containing ring or chamber 14. The orifice plate 20 contains a series of apertures 21 arranged in a circle concentric with the annular gas ring 14 and establishing an outlet therefor. The openings 21 are positioned parallel with the axis of the casing 1 and the annular ring 14. The orifice plate 20 is also provided with another opening 23 in line with the port 11 for a purpose which will appear later. From Figure 1 it is to be noted that the series of openings 21 are out of line with the port 10 by which the combustible enters the gas ring 14. By virtue of this construction, therefore, the incoming gas from the source of supply does not impinge directly on any one of the openings leading from the gas ring 14.

An oxygen dividing head or plate 30 is mounted within the casing 1 and is positioned directly against the orifice plate 20 and is formed with an enlarged or thickened circumferential portion 31 in which is formed an annular groove 32 acting as an oxygen ring and corresponding in function to the gas ring 14. The oxygen ring 32 is of annular formation and is arranged concentrically with respect to the axis of the casing 1 and the axis of the annular gas ring 14. Oxygen from the gas connection 5 is conducted into the gas ring 32 through the ports 11 and 23, as will be understood by referring to Figure 1. The gas ring 32 is of larger radius than the gas ring 14 and the head 30 is provided with bores or ducts 34 lining up with and forming a continuation of the ducts 21 in the plate 20. These ducts 34 are spaced in a circle around the axis of the annular chamber or gas ring 32, which circle is, however, of a smaller radius than the radius of the gas ring 32. This establishes an intervening wall 35 between the oxygen gas ring 32 and the ducts 34 in communication with the gas ring 14 which contains the combustible gas. A number of bores or ducts 39 connect the oxygen ring 32 with the ducts 34, there being as many ducts 39 as there are ducts 34, and the ducts 39 are arranged to join the ducts 34 at an angle thereto, as best shown in Figure 1. These ducts 39 are also inclined with respect to the radii about which the ducts 34 are positioned, as will be understood by referring to Figure 2.

A mixing chamber 40 is provided within the casing and just forward of the head 30, the latter actually forming one wall of the chamber. The other and opposite wall of the mixing chamber is formed by a head 42 having a stem portion 43 in engagement with the head 30.

The inner walls of the gas mixing chamber 40 are of particular formation. Considering a cross-section through the chamber 40 the portion of the stem 43 adjacent the head 30 is curved so that the axes of the ducts 39 are substantially tangential with respect thereto. The stem 43 is so formed that at points farther away from the head 30 the curve of the stem gradually changes its direction and begins to curve outwardly at a decreasing radius where the stem joins the head 42. This portion of the wall of the mixing chamber 40 continues the curve of the stem and the radius thereof is further decreased.

The thickened flange portion 31 of the head 30 is extended forwardly to a point somewhat adjacent the forward head 42, and this portion of the head 30 is provided with a groove 45 which is so formed as to continue the gradually decreasing curvature of the surface of the stem 43 and head 42. As will be seen from Figure 1, the cross-section through the mixing chamber approximates a spiral, the mixing chamber itself corresponding to or approximating a solid of revolution in which the generatrix is a spiral.

The outlets from the mixing chamber 40 are arranged around the circumference of the head 42 and are seen to comprise a plurality of grooves 49 which are laterally deflected in a direction opposite to the laterally deflected or inclined gas passages 39. Being arranged around a cylindrical surface, the grooves 49 are in actuality helical in formation.

Forward of the head 42 the casing 1 is provided with a final mixing chamber or portion 53 the forward wall 54 of which is reduced in cross-section and an outlet 55 arranged to receive a conduit 56 to which is secured a welding tip 58 of any desired size or form, depending upon the character of work to be done. As is well known in the art, these tips 58 are replaceable.

The operation of the device constructed according to the present invention is substantially as follows. Valves 7 and 8 are properly adjusted so as to permit the introduction of the oxygen at somewhat greater pressure than the combustible, the oxygen flowing in through the gas connection 5, the ports 11 and 23, and into the oxygen ring or chamber 32. From the annular chamber 32 the oxygen flows through the inclined and laterally deflected ducts 39. The combustible enters the gas receiving head 2 through the gas connection 4, the ports 10 and 15, and through the openings 21 into the ducts 34 which join the inclined ducts 39 at a common outlet point. The oxygen in flowing through the ducts 39 entrains the combustible and causes the latter to flow in with the oxygen into the mixing chamber 40 by aspiration.

By virtue of the inclination and deflection of the oxygen ducts 39 the fluid stream of intermingled gas and oxygen is directed against the curved walls of the mixing chamber and caused to follow the same in a spiral or vortical path within the chamber, at the same time the whirling gas streams emanating from the various ducts 39 progress around the annular mixing chamber 40 in a counter-clockwise direction as viewed in Figure 2. By virtue of this construction the combustible and oxygen gases are thoroughly mixed. It is to be noted that the spiral or curved cross-section of the annular chamber causes any one stream of intermingled combustible and oxygen to be reversed in direction of flow and to be diverted back upon an incoming stream and to be impinged thereon. This is an important feature of the present invention in that the impact of one stream upon another or upon another portion of the same stream scatters the gas particles in many directions and effectively breaks up any remaining masses of unmixed gases.

The progression of the whirling gases in a tortuous path around the mixing chamber is also an important feature in that the streams of any one duct 39 is thoroughly mixed with stream or streams emerging from any of the other ducts.

The mixed gases are conducted out of the mixing chamber proper by a plurality of grooves 49 formed in the periphery of the head 42, as described above. These ducts or grooves 49 are relatively small in cross-section and act to materially increase the velocity of the gases above their velocity in the mixing chamber 40 proper and are so angularly related to the direction of the progression of these moving gases in the mixing chamber that their direction is substantially reversed. That is, the movement of the gases in the mixing chamber is in a counterclockwise direction when viewed by looking toward the right in Figure 1. However, as the gases emerge from the grooves or ducts 49 the gases are reversed in rotation and now rotate in a clockwise direction. This final reversal of direction of movement together with the momentary increase in velocity when passing through the ducts 49, is important in that the gases are agitated and whirled about, causing various eddy currents which alter the direction and velocity of the gas streams and assuring that the two gases in their final stage of mixture are thoroughly and intimately mixed and of exceedingly uniform composition. The mixed gases pass through the opening 55 and into the tube or conduit 56 and through the tip 58 in the usual manner. The various shoulders and sharp angles in the final mixing chamber 53 contribute to the thorough mixing of the gases in the final stage of the mixing operation.

While I have shown and described the preferred embodiment of the present invention, it is to be understood that my invention is not to be limited to the specific means shown and described, but that, in fact, widely different means may be employed in the practice of the broader aspects of my invention.

What I claim, therefore, and desire to secure by Letters Patent is:

1. In the art of welding, brazing, or the like, employing gases, the process of mixing the gases which comprises introducing both gases into a mixing zone, imparting a spiral motion thereto, changing the direction of flow of the gases to cause them to flow in a generally backward direction opposite to that in which they entered the mixing zone, and reversing the direction of the spiral to secure an intimate mixture of the gases.

2. A device for burning gases and the like, comprising, in combination, a burner, a gas receiving head having a pair of separated ports, valve means for controlling each port, a plurality of conduits leading from each of said ports, the conduits from one port connected respectively with the conduits from the other port, whereby the gases are brought into mutual contact, an annular mixing chamber to receive the gases from said conduits, said conduits opening into said chamber at an angle to cause the gases to advance around the chamber in spiral precession, the chamber being formed to reverse the direction of flow of the gas streams emerging from said conduits and direct the stream from each conduit against the incoming gas stream from a different conduit so as to thoroughly mix the two gases, and conduit means leading from the mixing chamber to said burner.

3. A torch for use in welding and the like, comprising a pair of separated gas connections, a ported head mounting said connections, the ports of said head being joined so that the flow of one gas aspirates the other, a mixing chamber for receiving the flow from said ports and having toroidal wall surfaces to receive said flow, the ports opening substantially tangentially into the chamber and at an angle thereto, so that the swirling gases in the chamber are directed around the chamber in circular precession therein to cause interference between the gas streams in the mixing chamber and the incoming gas streams whereby the gases are thoroughly mixed, and conduit means leading substantially tangentially from said mixing chamber.

4. A torch for use in welding and the like, comprising a casing, a gas receiving head having a pair of separated gas connections, means providing ports in communication, respectively, with said gas connections, a gas mixing chamber having angularly disposed jets receiving the gas flow from said ports and formed to impart a whirl to the gas streams emerging from said ports to cause the gas streams to move in a helical path progressing around the axis of the casing as a center separate from the axis of the helical path, and conduit means leading from the mixing chamber and formed to whirl the gases in the opposite direction at an increased velocity.

5. A torch for use in welding and the like, comprising a casing, a gas receiving head having a pair of separated gas connections, means providing ports in communication, respectively, with said gas connections, means cooperating with said casing and forming in conjunction therewith a gas mixing chamber receiving the gas flow from said ports, said last named means including parts having walls approximating toroidal curved surfaces of decreasing radii and said ports opening into said chamber at an angle with respect thereto to impart movement to the gases along a tortuous path in a given direction in the chamber, whereby the gases are intimately mixed, and discharge ports disposed adjacent the periphery of said last named means and leading from said chamber to receive gases from the toroidal surfaces of lesser radii and to conduct the same out of the chamber in a direction varying from the direction of their movement therein.

6. A welding torch comprising, in combination, a casing, a transverse head at one end having a pair of valve controlled ports, means providing an annular gas chamber concentric with the casing and in communication with one end of one of said ports, said means including an orifice plate completing said chamber and having openings out of line with the communication between said chamber and said one port, means forming a second annular gas chamber concentrically arranged with respect to the axis of the casing and in communication with the other of said ports, said last named means having two series of ducts, the ducts of one series opening into one of said chambers and the ducts of the other series communicating with the other chamber through the openings in said orifice plate, the ducts of one series being joined, respectively, with the ducts of the other series to provide a common outlet for each pair of ducts, whereby the gas flowing through one series of ducts draws in gas through the ducts of the other series, a gas mixing chamber providing an annular mixing zone of spiral cross section and concentric with respect to said casing, the outlet of said ducts discharging tangentially into said spiral mixing zone, and conduit means leading from the mixing chamber.

7. A welding torch comprising, in combination, a casing, a transverse head at one end having a pair of valve controlled ports, means providing an annular gas chamber concentric with the casing and in communication with one of said ports, means forming a second annular gas chamber concentrically arranged with respect to the axis of the casing and in communication with the other of said ports, said last named means having two series of ducts, the ducts of one series opening into one of said chambers and the ducts of the other series opening into the other chamber, the ducts of one series being joined, respectively, with the ducts of the other series to provide a common outlet for each pair of ducts, whereby the gas flowing through one series of ducts draws in gas through the ducts of the other series, a gas mixing chamber providing an annular mixing zone of spiral cross section and concentric with respect to said casing, the outlet of said ducts discharging laterally and tangentially into said mixing zone so that the flowing gases whirl around the walls of the spiral mixing zone and also rotate in one direction around the mixing zone, whereby the gases are thoroughly mixed, and a plurality of outlet ducts leading from the mixing zone and positioned angularly with respect to the axis of said mixing zone to cause the gases to rotate in a direction opposite to the direction in which they rotate in the annular mixing zone.

8. In a device for burning gases and the like, in combination, a burner, an annular gas mixing chamber, ducts opening into said chamber at an angle with respect to a plane passing through the axis of the chamber for introducing gas therein, said ducts cooperating with the walls of said chamber for directing said gas to swirl within said chamber and to advance about the axis of the annulus, describing substantially a helix, and means conducting said gas to said burner.

9. In a device for burning gases and the like, an annular gas mixing chamber, ports opening into said chamber substantially tangentially and at an angle with respect to a plane passing through the axis of the chamber for introducing gas thereto, said ports cooperating with the walls of said chamber for directing said gas to swirl about and along a circle which lies within the annulus and encircles the axis of the annulus, ducts conducting said gas from said chamber, said ducts curving about the axis of said annulus in a direction opposite to that of the precession of the swirling gas within the annulus, and a burner in communication with said ducts.

10. A device for burning gases and the like comprising, in combination, a gas burner, a gas receiving head having a pair of ports formed therein, an annular mixing chamber associated with said gas receiving head, a plurality of conduits leading from said ports to said chamber, the conduits from one port connected, respectively, with the conduits from the other port and serving to partially mix the gases before they emerge from said conduits into said chamber, said conduits leading into said chamber at an angle with respect thereto to cause the gases to advance around the chamber in spiral precession and the chamber being formed to reverse the direction of flow of the gas streams emerging from said conduits, whereby the gas or stream coming from one conduit is directed against the incoming gas stream from a different conduit, and means for directing the gases from the mixing chamber to said burner.

11. In a device for burning gases and the like, in combination, a burner, a pair of spaced conduits for conveying gases having different characteristics, a plurality of ducts communicating with each of said conduits and receiving gas therefrom, an annular gas mixing chamber having curved walls and adapted to receive the flow from said ducts, the ducts from one conduit meeting the ducts from the other conduit at converging angles and certain of said ducts being angularly disposed and cooperating with the curved walls of said chamber so as to cause the gases to swirl about an annular axis and to advance along said axis, describing substantially a helix, and means conducting said gases to said burner.

HAROLD L. MAXWELL.